US008645842B2

(12) United States Patent
Kondziela et al.

(10) Patent No.: US 8,645,842 B2
(45) Date of Patent: Feb. 4, 2014

(54) INTERACTIVE GROUP CONTENT SYSTEMS AND METHODS

(75) Inventors: James Mark Kondziela, Stamford, CT (US); Heath Stallings, Colleyville, TX (US); Don Relyea, Dallas, TX (US); Brian Roberts, Frisco, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1171 days.

(21) Appl. No.: 11/935,183

(22) Filed: Nov. 5, 2007

(65) Prior Publication Data

US 2009/0119590 A1     May 7, 2009

(51) Int. Cl.
*G06F 3/00* (2006.01)

(52) U.S. Cl.
USPC .......................................................... 715/751

(58) Field of Classification Search
USPC .................................. 715/734, 748, 759, 751
See application file for complete search history.

(56) References Cited

U.S. PATENT DOCUMENTS

| | | | |
|---|---|---|---|
| 2003/0014530 A1* | 1/2003 | Bodin et al. | 709/231 |
| 2006/0004914 A1* | 1/2006 | Kelly et al. | 709/219 |
| 2006/0031759 A1* | 2/2006 | Brown et al. | 715/514 |
| 2006/0041923 A1* | 2/2006 | McQuaide, Jr. | 725/131 |
| 2006/0218501 A1* | 9/2006 | Wilson et al. | 715/769 |
| 2006/0253491 A1* | 11/2006 | Gokturk et al. | 707/104.1 |
| 2006/0259957 A1* | 11/2006 | Tam et al. | 726/3 |
| 2007/0283278 A1* | 12/2007 | Hupfer et al. | 715/751 |
| 2008/0140523 A1* | 6/2008 | Mahoney et al. | 705/14 |

OTHER PUBLICATIONS

Spring, Tom. "Post Snapshots on Your Online Refrigerator". PC World. Nov. 27, 1998.*
Apple Web Page, http://www.apple.com/dotmac/webgallery.html, 2 pages, first accessed Nov. 5, 2007.

* cited by examiner

*Primary Examiner* — Omar Abdul-Ali

(57) ABSTRACT

In an exemplary system, a content hub subsystem is selectively and communicatively coupled to a plurality of access devices. At least a subset of the access devices is associated with a predefined group of users. The content hub subsystem is configured to receive data representative of content from at least one of the access devices associated with the predefined group of users, map the content to the predefined group of users, and provide data representative of the content to the access devices associated with the predefined group of users. Each of the access devices associated with the predefined group of users is configured to generate at least one interactive graphical object representative of the content, and generate and present a graphical user interface including the interactive graphical object.

25 Claims, 15 Drawing Sheets

INTERACTIVE GROUP CONTENT SYSTEMS AND METHODS

BACKGROUND INFORMATION

Advances in electronic communications technologies have interconnected people and allowed for distribution of information perhaps better than ever before. One currently popular forum for sharing personal information is a social networking website. Typically, a person creates a profile about himself or herself on such a website. The person is generally given control over his or her individual profile at a specific "location" within the website. The user can upload information to the location, and other people can browse to the location and view the information. However, the ability for people to interact with the information, or with each other using the information, is limited by traditional web models. Moreover, many social networking websites allow anyone to view posted information, which has raised security concerns and likely made certain users reluctant to participate.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
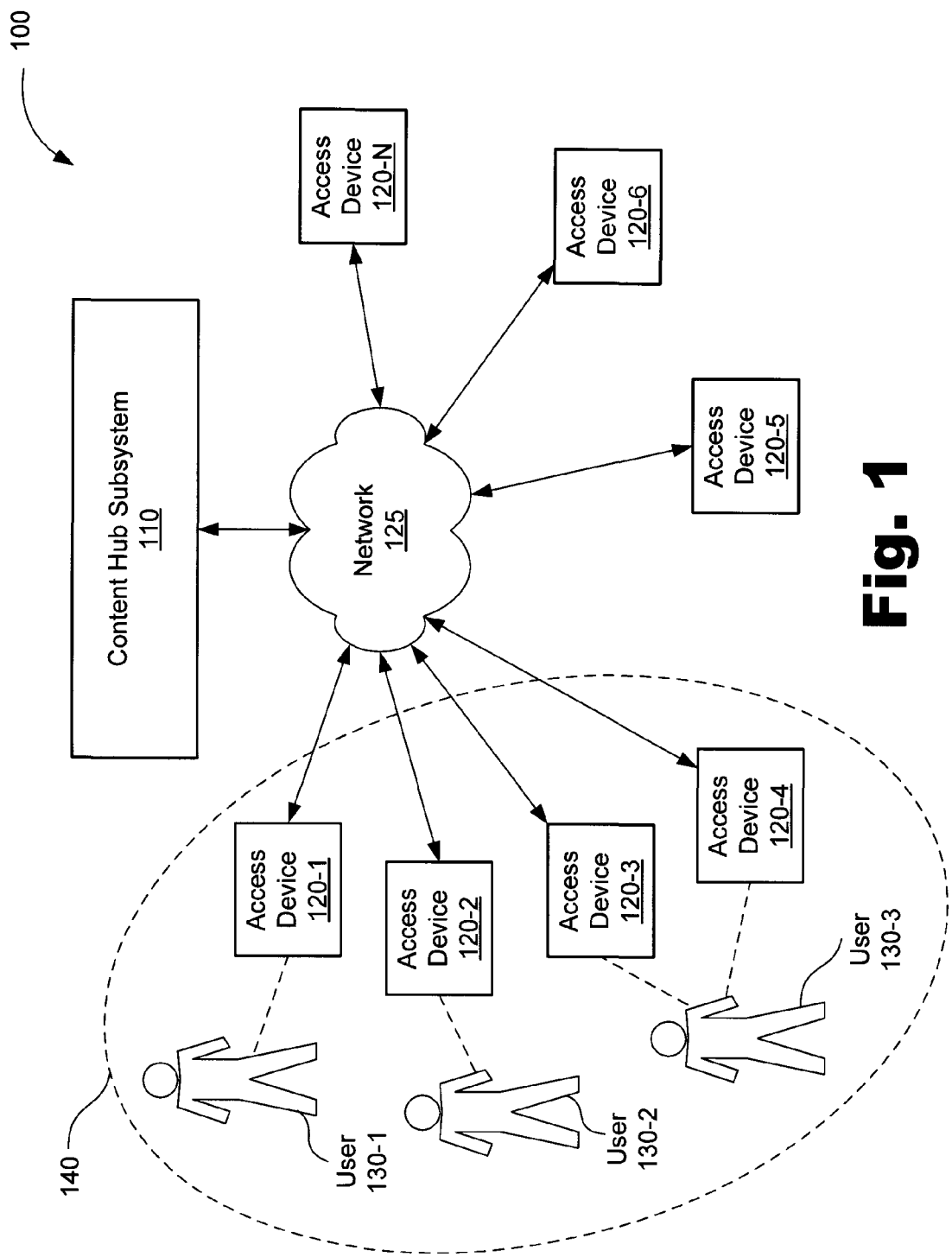
FIG. 1 illustrates an exemplary interactive group content system.

Exemplary interactive group content systems and methods are described herein. In an exemplary system, a content hub subsystem and a plurality of access devices are configured to selectively communicate with one another over one or more networks. The content hub subsystem may maintain data related to the access devices and their users, as well as data defining one or more groups of users.

Users included in a group may utilize access devices to provide (e.g., upload) content to the content hub subsystem. The content may be provided from diverse geographic locations and by way of diverse computing and communications platforms and technologies, including, but not limited to, voice communication platforms (e.g., wireless telephone, landline, and Voice over Internet Protocol platforms), Internet platforms (e.g., web platforms), and subscriber television platforms.

The content hub subsystem may be configured to receive content from one or more of the users in the group, map the content to the group, and provide (e.g., distribute) the content to access devices associated with users in the group. The content hub subsystem may be configured to push uploaded group content to the appropriate access devices associated with a group in real time or near real time. The content hub subsystem may be able to distribute the content to diverse geographic locations and computing platforms using diverse communications platforms and technologies. To allow support for diverse platforms and communications technologies, content hub subsystem may be configured to decode and/or encode content in various communications and/or data formats for the diverse platforms, including encoding content for transmission over various communications platforms.

As used herein, the term "content" or "group content" may refer to one or more "content instances," which may include, but are not limited to, electronic data representative of text, one or more messages (e.g., short message service ("SMS") messages or multimedia message service ("MMS") messages), one or more symbols, one or more graphics, one or more images (e.g., digital photographs and video frames), video, audio, multimedia, or any segment, portion, component, or combination thereof. "Content" distributed by the content hub subsystem to users in a group may be referred to as "group content."

Access devices associated with the users in the group may be configured to receive, decode, and/or otherwise process the group content distributed by the content hub subsystem. In certain embodiments, each of the access devices may include an application client configured to generate at least one interactive graphical object for the content distributed by the content hub subsystem. The application client may be configured to generate interactive graphical objects for a variety of content types, including, but not limited to, text, video, audio, images (e.g., pictures and photographs), and multimedia content instances.

As will be illustrated in more detail below, an interactive graphical object may be configured to function as an interactive representation of content and may include at least one graphic representative of the content, such as a generated image of textual content or a selected image representative of content type (e.g., an image indicative of an audio message), for example. In some examples, the graphic may comprise at least a subset of the content, such as a frame image of a video content instance. A graphic included in an interactive graphical object may be generated or selected based on the content and/or content type. Examples of interactive graphical objects will be described in more detail below.

The application client may also be configured to generate and provide a graphical user interface ("GUI") for display by an access device. The GUI may include one or more interactive graphical objects representative of content that has been provided by and distributed to users in the group. Accordingly, the users are able to provide content to the group and experience content collectively provided by users of the group. In certain embodiments, as will be described in more detail below, the GUI includes a mosaic display of interactive graphical objects representative of group content.

The application client may be further configured to provide one or more tools enabling a user of an access device to interact with interactive graphical objects in the GUI. Tools for interacting with the interactive graphical objects may be provided as part of the interactive graphical objects. As an example, an interactive graphical object including a graphic in the form of a shopping list image may provide a tool enabling users in the group to edit the shopping list, including adding or deleting list items. Data representative of an edit to content in an interactive graphical object, such as an addition to a shopping list, may be transmitted to the content hub subsystem in the form of updated content and distributed to the users in the group as described above. Each of the access devices associated with the users may receive the updated content and generate and present an updated interactive graphical object that includes data reflective of the updated content (e.g., an updated shopping list image). Accordingly, users in a group can use interactive graphical objects to collaborate and interact, such as by collectively creating and modifying a shopping list or other content. Other exemplary tools and user interactions with interactive graphical objects and content will be described further below.

Based on the above, users included in a predefined group can create, provide, experience, modify, and/or otherwise interact with content. This provides a way for the users to conveniently, intuitively, and flexibly communicate, interact, and collaborate with one another using shared group content.

The systems and methods disclosed herein may be of use to a wide variety of different groups. To illustrate, an exemplary group may include members of a family. The family may subscribe to a group service including, but not limited to a mobile telephone service such as a "family share plan." Each access device (e.g., a mobile telephone) associated with each member of the group may be equipped with an application client and configured to communicate with the content hub subsystem. Accordingly, members of the group may create and send content to the content hub subsystem, e.g., via SMS or MMS messaging, and the collective group content may be distributed to one or more of the access devices associated with the members of the group. As described above, the application client operating on each member access device may be configured to generate and provide a GUI including one or more interactive graphical objects representative of the content provided to the content hub subsystem by members of the group, as well as tools for interacting with the content.

Such an implementation in the context of a family group can be used to provide a family with a generally convenient, intuitive, productive, secure, and potentially enjoyable way to use content to communicate, interact, and collaborate, even when members of the family are at geographically remote locations. In a family group implementation, certain features provided by the systems and methods disclosed herein may be described as a "virtual refrigerator door" user interface in which group content can be interactively posted, updated, and experienced by members of the group, even when members of the family are at geographically remote locations. Accordingly, an application client may be configured to provide audio and/or visual effects representative of a "virtual refrigerator door" metaphor, including effects representative of using magnetism to attach items to a refrigerator door, for example.

Exemplary embodiments of interactive group content systems and methods will now be described in more detail with reference to the accompanying drawings.

FIG. 1 illustrates an exemplary interactive group content system 100. As shown in FIG. 1, interactive group content system 100 (or simply "system 100") may include a content hub subsystem 110 selectively and communicatively connected to a plurality of access devices 120-1 through 120-N (collectively "access devices 120") by way of a network 125.

The access devices 120 and the content hub subsystem 110 may communicate over network 125 using any communication platforms and technologies suitable for transporting data representative of content, including known communication technologies, devices, media, and protocols supportive of remote data communications, examples of which include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Short Message Service ("SMS"), Multimedia Message Service ("MMS"), socket connections, signaling system seven ("SS7"), Ethernet, in-band and out-of-band signaling technologies, and other suitable communications networks and technologies.

Network 125 may include one or more networks, including, but not limited to, closed media networks, subscriber television networks, cable networks, satellite networks, the Internet, intranets, local area networks, wireless networks (e.g., mobile telephone networks), public networks, private networks, optical fiber networks, broadband network, voice communications networks (e.g., Voice over Internet Protocol "(VoIP") networks and Public Switched Telephone networks ("PSTN")), and any other networks capable of carrying data representative of content and communications signals between access devices 120 and content hub subsystem 110. Communications between the content hub subsystem 110 and the access devices 120 may be transported using any one of above-listed networks, or any combination of the above-listed networks.

In certain embodiments, network 125 may include one or more closed networks such as closed provider-specific networks (e.g., a wireless telephone network, a VoIP network, or a subscriber television network such as a Verizon® FIOS® network). A closed network may be configured to provide content and/or services to authenticated users (e.g., subscribers). Additionally or alternatively, network 125 may include an open network such as the Internet.

Access devices 120 may be associated with users, which in certain embodiments may be subscribers to or users of one or more services (e.g., a wireless telephone service) provided over network 125. As an example, FIG. 1 shows users 130-1, 130-2, and 130-3 (collectively "users 130") as being associated with certain ones of the access devices 120. In FIG. 1, user 130-1 is associated with access device 120-1, user 130-2 is associated with access device 120-2, and user 130-3 is associated with access devices 120-3 and 120-4. The exemplary users 130 and their associations with access devices 120-1 through 120-4 are shown for illustrative purposes. Other users 130 and user associations with access devices 120 may be defined in system 100.

Users may be organized in groups, which may be defined in system 100. As an example, users 130-1, 130-2, and 130-3 may be defined as group 140. Group 140 may include members of a family, household, business entity, community, club, online community, school, church, or other organization or grouping. In certain examples, group 140 may include users who are associated with a service subscription account for services provided over network 125, such as a subscription to wireless telephone services (e.g., a "family share plan" account), for instance.

Group 140 is illustrative only. Other groups of users may be defined and may include one or more users associated with any of the access devices 120. Groups may overlap. For example, a user may be a member of more than one group. Content hub subsystem 110 may maintain data representative of access devices, users, and user groups, as described below.

Utilizing access devices 120-1 through 120-4, users 130 are able to provide content to and receive content from content hub subsystem 110 over network 125. Content hub subsystem 110 may be configured to receive content from a user 130, map the content to group 140, and distribute the content to access devices 120-1 through 120-4 corresponding with users 130 in the group 140.

In some examples, the system 100 may include any computer hardware and/or instructions (e.g., software programs), or combinations of software and hardware, configured to perform the processes described herein. In particular, it should be understood that components of system 100 may be implemented on one physical computing device or may be implemented on more than one physical computing device. Accordingly, system 100 may include any one of a number of well known computing devices, and may employ any of a number of well known computer operating systems, including, but by no means limited to, known versions and/or varieties of the Microsoft Windows® operating system, the UNIX operating system, Macintosh® operating system, and the Linux® operating system.

Accordingly, the processes described herein may be implemented at least in part as computer-executable instructions, i.e., instructions executable by one or more computing devices, tangibly embodied in a computer-readable medium. In general, a processor (e.g., a microprocessor) receives instructions, e.g., from a memory, a computer-readable medium, etc., and executes those instructions, thereby performing one or more processes, including one or more of the processes described herein. Such instructions may be stored and transmitted using a variety of known computer-readable media.

A computer-readable medium (also referred to as a processor-readable medium) includes any medium that participates in providing data (e.g., instructions) that may be read by a computer (e.g., by a processor of a computer). Such a medium may take many forms, including, but not limited to, non-volatile media, volatile media, and transmission media. Non-volatile media may include, for example, optical or magnetic disks and other persistent memory. Volatile media may include, for example, dynamic random access memory ("DRAM"), which typically constitutes a main memory. Transmission media may include, for example, coaxial cables, copper wire and fiber optics, including the wires that comprise a system bus coupled to a processor of a computer. Transmission media may include or convey acoustic waves, light waves, and electromagnetic emissions, such as those generated during radio frequency ("RF") and infrared ("IR") data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Figure 2:
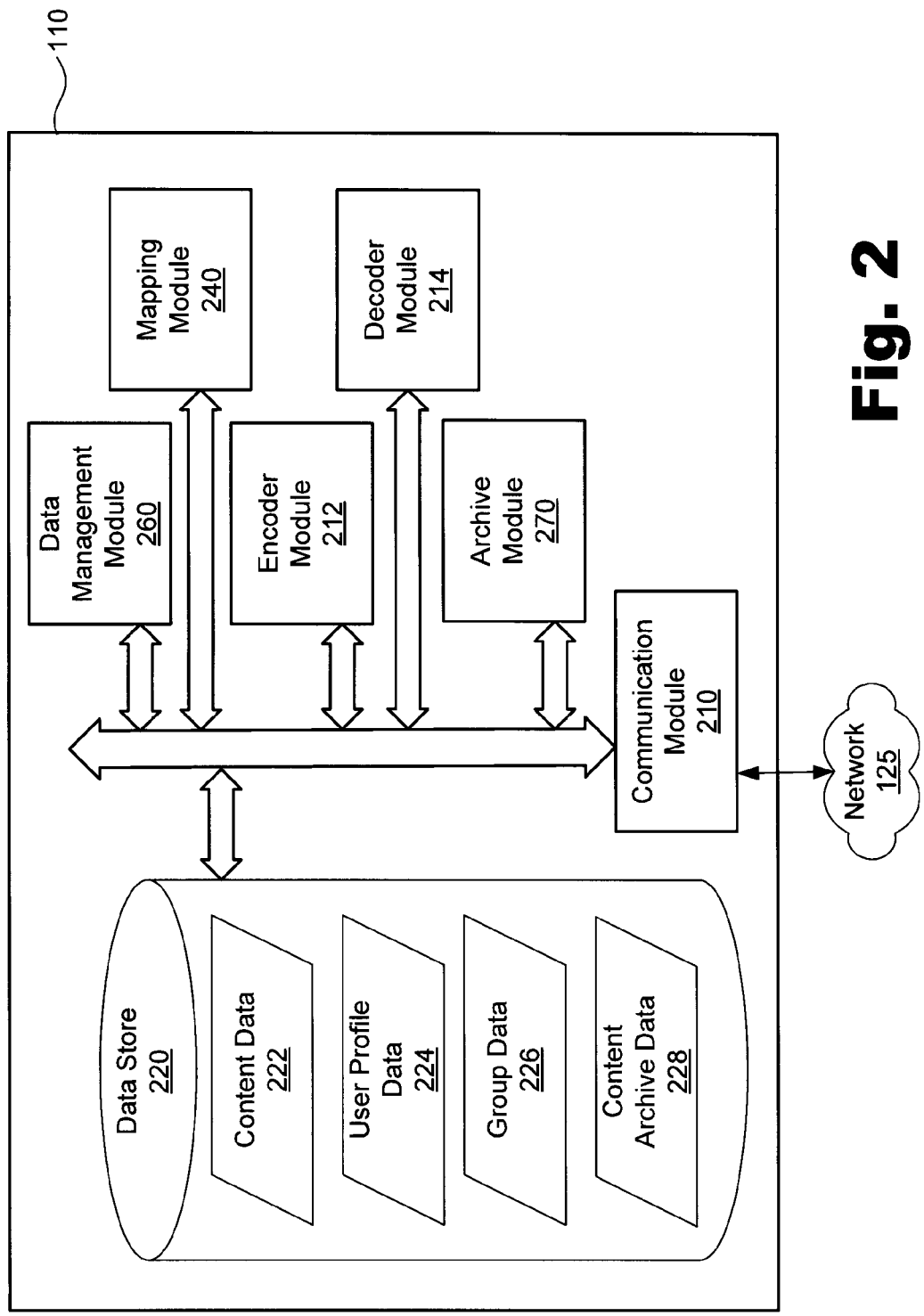
FIG. 2 illustrates an exemplary content hub subsystem that may be included in the system of FIG. 1.

FIG. 2 illustrates an exemplary content hub subsystem 110. While an exemplary content hub subsystem 110 is shown in FIG. 2, the exemplary components illustrated in FIG. 2 are not intended to be limiting. Indeed, additional or alternative components and/or implementations may be used.

As shown in FIG. 2, content hub subsystem 110 may include a communication module 210, which may be configured to transmit and receive communications over network 125, including receiving data representative of content from and providing data representative of content to access devices 120 by way of network 125. The communication module 210 may include and/or support any suitable communication platforms and technologies for communicating with and transporting content to/from access devices 120 over network 125. In some embodiments, communication module 210 may include one or more servers (e.g., a content server, messaging server, and/or web server) configured to send and receive communications and content over network 125. Communication module 210 may be configured to process or preprocess content and communications received from or to be transmitted to access devices 120.

Communication module 210 may be configured to receive access requests and authentication information from an access device 120. The communication module 210 may verify the authentication information and use the information to identify a user profile for a user associated with the access device 120. For example, a "single-sign-on" technology may be used for controlling access to services and/or content provided by content hub subsystem 110 and for identifying any predefined groups to which a user belongs.

Content hub subsystem 110 may include an encoder module 212 and decoder module 214, respectively configured to encode and decode communications, content, and/or other data. For example, encoder module 212 may be configured to encode content for transmission to an access device 120 over network 125, and decoder module 214 may be configured to decode content received from an access device 120 over network 125. Encoder 212 and decoder 214 modules may be configured to support a variety of communication platforms, protocols, and formats such that content hub subsystem 110 can receive content from and distribute content to access devices 120 of a variety of platforms (e.g., a mobile telephone service platform, a web-based platform, a subscriber television platform, etc.) and using a variety of communications technologies. Accordingly, the content hub subsystem 110 can support a multi-platform system in which content can be shared across diverse platforms and in a manner that generally maintains a level of uniformity between user interfaces across the platforms.

Content hub subsystem 110 may be configured to utilize encoder module 212 and decoder module 214 to convert between data formats and/or protocols. As an example, content hub subsystem 110 may receive content encoded in a particular format (e.g., a short message service ("SMS") format) from access device 120-1, decode the content, encode the content into another format (e.g., a Session Initiation Protocol ("SIP") format), and provide the encoded content in the other format to access device 120-2. In this or similar manner, content hub subsystem 110 may be configured to transcode content to support a variety of formats and platforms. A format to which a content instance will be encoded may be selected by content hub subsystem 110 based on attributes of network 125 (e.g., available bandwidth or communication platform) and/or attributes an access devices 120

(e.g., data storage capacity, processing power, graphical capabilities, or computing platform) targeted to receive the content instance. Examples of data format conversions may include, but are in no way limited to, MPEG-2 to MPEG-4 and MP3 to Advanced Audio Coding ("AAC") conversions.

Content hub subsystem 110 may include a data store 220 configured to store electronic data. Data store 220 may include one or more data storage mediums, devices, or configurations and may employ any type, form, and combination of well known storage media, including hard disk drives, read-only memory, caches, databases, optical media, and random access memory. Data store 220 may include any known technologies useful for storing, updating, searching, modifying, accessing, retrieving, and deleting electronic data. While FIG. 2 illustrates a single data store 220, the data store 220 may include multiple data storage media, databases, or devices.

Data store 220 may store any suitable type or form of electronic data. As shown in FIG. 2, data store 220 may include content data 222, user profile data 224, group data 226, and content archive data 228. Content data 222 may include data representative of any content or content types described herein. Content data 222 may be organized, indexed, or searched in any acceptable way, including by user, group, timestamp information, content type, or other attribute associated with content.

In certain embodiments, content data 222 may include tags associated with content instances. The tags may include any information related to content, including, but not limited to, sender information, addressee information, timestamp information, content type information, associated group information, related content information, and geographic information such as data indicating a location at which a content instance was created or from which the content instance was transmitted by an access device 120. Tags including geographic information may be referred to as "geo-tags." Tags may be associated with content by users of access devices 120, applications running on access devices 120 (e.g., Global Positioning System applications), or content hub subsystem 110.

As an example, access devices 120-1 through 120-4 associated with users 130 in group 140 may be equipped with applications for determining geographic locations of the access devices 120-1 through 120-4. When users 130 utilize access devices 120-1 through 120-4 to create and/or provide content to content hub subsystem 110, the access devices 120-1 through 120-4 may be configured to attach geo-tags representative of the locations of the access devices 120-1 through 120-4 to the content. Accordingly, when the content is distributed to group 140, users 130 may be able to access information descriptive of geographic locations (e.g., maps) associated with content. For instance, user 130-1 may utilize access device 120-1 to take a picture and upload the picture to content hub subsystem 110. The picture may include a geo-tag descriptive of a geographic location at which the picture was taken.

User profile data 224 may include any information descriptive of users who are associated with access devices 120 or who receive services provided over network 125. User profile data 224 may include user authentication information, user identifiers, information about one or more access devices 120 that correspond with a user (e.g., device identifiers, network addresses, network resources, computing resources, platforms, etc.), user preferences, and any other information related to users.

Group data 226 may include any information that can be used to identify groupings of users and/or access devices 120. For example, group data 226 may include information indicating that users 130 are members of group 140. Accordingly, group data 226 may be useful for mapping a user or content associated with the user to one or more groups to which the user belongs. In certain embodiments, group data 226 may include information that can be used to access user profile data 224 for users in a group, and the user profile data 224 may include information that can be used to identify user associations with access devices 120. Accordingly, content data 222, group data 226 and user profile data 224 may be used to map received content to a group.

Group data 226 may be defined in any suitable manner, including users (e.g., a subscription account owner) defining groups and providing data representative of the defined groups to content hub subsystem 110. In certain embodiments, at least certain groups are defined based on user subscription accounts for services provided over network 125. For example, a default group may be defined by configuration hub subsystem 110 to include any users associated with a subscription account such as a wireless telephone services "family share plan" account.

Content hub subsystem 110 may include a mapping module 240 configured to map content provided by the user to one or more predefined groups of users to which the user is a member. For example, a particular user 130-1 may utilize access device 120-1 to provide content to content hub subsystem 110. Mapping module 240 may access and use content data 222, group data 226, and/or user profile data 224 to determine that the user is a member of group 140. The mapping module 240 may then identify the users 130 in group 140, as well as the access devices 120-1 through 120-4 that are associated with the users 130 of group 140. From this information, mapping module 240 may be configured to generate a distribution list of access devices 120-1 through 120-4 to which the content will be distributed. The content hub subsystem 110 may appropriately encode and transmit data representative of the content to the identified access devices 120-1 through 120-4. In certain embodiments, content hub subsystem 110 may be configured to push data representative of the uploaded content to the identified access devices 120-1 through 120-4 in real time or near real time. Alternatively, content hub subsystem 110 may be configured to provide a notification of the presence of the content ("new content") to the identified access devices 120-1 through 120-4, which may then request and access (e.g., download) the content.

As shown in FIG. 2, content hub subsystem 110 may include a data management module 260, which may include any devices and technologies configured to manage the data stored in data store 220, including accessing, updating, searching, modifying, deleting, and adding to the data. The data management module 260 may communicate with other components of the content hub subsystem 110 to receive and store or access and provide copies of data. For example, the communication module 210 may provide content and instructions to the data management module 260 for use in updating the content data 222 in data store 220, or the mapping module 240 may instruct the data management module 260 to retrieve a copy of a content instance stored in content data 222 to be transmitted to one or more access devices 120.

In addition to functionality related to receiving, mapping, and distributing group content, content hub subsystem 110 may be configured to provide other functionality to users of access devices 120. For example, content hub subsystem 110 may include an archive module 270, which may be configured to automatically generate content archive data 228 from content data 222. Content archive data 228 may be organized by group. Accordingly, a record of content provided by a group may be created automatically, without any additional user effort. Such a record may be configured as may suit any particular group, purpose, or application. For example, where a group is a family, the content archive data 228 may be configured as a digital family album or scrapbook.

In certain embodiments, archiving and/or content creation tools such as scrapbooking or movie editing tools may be provided to users. Such tools may be provided in the form of software operating on access devices 120, content hub subsystem 110, or third-party servers and may provide functionality with which users can create user content data 222 or content archive data 228 to create new content arrangements such as family scrapbooks.

Access device 120 may include any device physically or remotely accessible to one or more users and that allows a user to send and receive communications and content to/from content hub subsystem 110 over network 125. Access device 120 may also enable users to experience or utilize content or services accessed over network 125. Access device 120 may include, but is not limited to, one or more desktop computers, laptop computers, tablet computers, personal computers, personal data assistants, wireless communication devices (e.g., cellular telephones and satellite pagers), wireless internet devices, embedded computers, video phones, Verizon One phones, Verizon Hub phones, video-enabled wireless phones, mainframe computers, mini-computers, vehicular computers, entertainment devices, gaming devices, music devices, video devices, closed media network access devices, set-top boxes, digital imaging devices, digital video recorders, personal video recorders, any network-connectible device having a display or content processing capability, content recording devices (e.g., video cameras such as camcorders and still-shot digital cameras), display devices that can be attached to a surface such as a refrigerator door or panel, and any other devices capable of providing content to and/or receiving content from the content hub subsystem 110. Access device 120 can also include and/or be configured to interact with various peripherals such as a terminal, keyboard, mouse, display screen, printer, stylus, input device, output device, or any other apparatus that can help provide interaction with access device 120.

Figure 3:
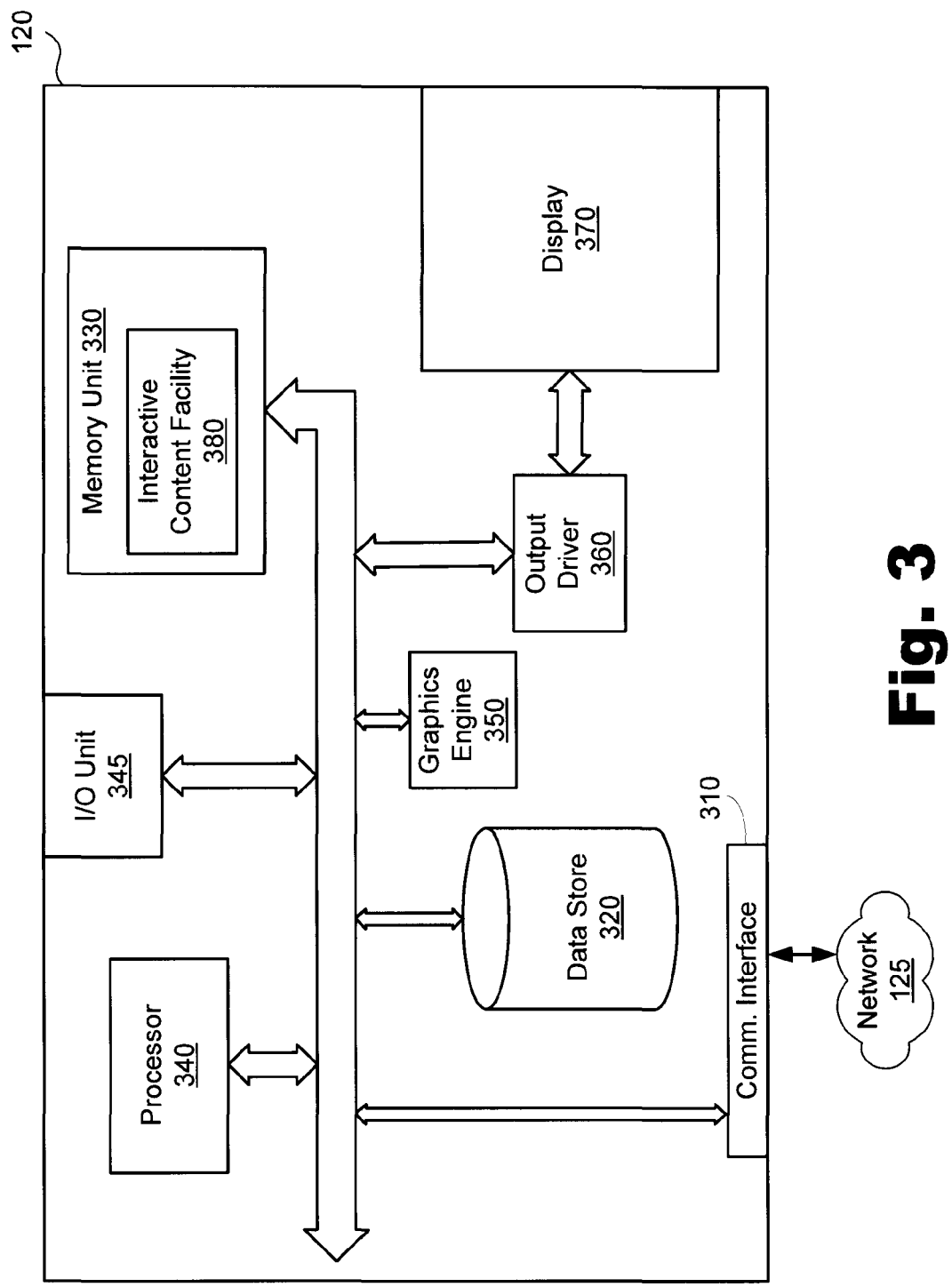
FIG. 3 illustrates an exemplary access device that may be included in the system of FIG. 1.

FIG. 3 illustrates an exemplary access device 120. As shown in FIG. 3, the access device 120 may include a communication interface 310, data store 320, memory unit 330, processor 340, input/output unit 345 ("I/O unit 345"), graphics engine 350, output driver 360, and display 370 communicatively connected to one another. While an exemplary access device 120 is shown in FIG. 3, the exemplary components illustrated in FIG. 3 are not intended to be limiting. Indeed, additional or alternative components and/or implementations may be used.

Communication interface 310 may be configured to send and receive communications over network 125, including sending and receiving data representative of content to/from content hub subsystem 110. Communication interface 310 may include any device, logic, and/or other technologies suitable for transmitting and receiving data representative of content. The communication interface 310 may be configured to interface with any suitable communication media, protocols, formats, platforms, and networks, including any of those mentioned herein.

Data store 320 may include one or more data storage media, devices, or configurations and may employ any type, form, and combination of storage media. For example, the data store 320 may include, but is not limited to, a hard drive, network drive, flash drive, magnetic disc, optical disc, or other non-volatile storage unit. Data, including data representative of content, may be temporarily and/or permanently stored in the data store 320.

Memory unit 330 may include, but is not limited to, FLASH memory, random access memory ("RAM"), dynamic RAM ("DRAM"), or a combination thereof. In some examples, as will be described in more detail below, applications executed by the access device 120 may reside in memory unit 330.

Processor 340 may be configured to control operations of components of the access device 120. Processor 340 may direct execution of operations in accordance with computer-executable instructions such as may be stored in memory unit 330. As an example, processor 340 may be configured to process content, including decoding and parsing received content and encoding content for transmission to content hub subsystem 110.

I/O unit 345 may be configured to receive user input and provide user output and may include any hardware, firmware, software, or combination thereof supportive of input and output capabilities. For example, I/O unit 345 may include one or more devices for recording content, including, but not limited to, a still-shot and/or video camera, scanner, microphone, keyboard or keypad, touch screen component, and receiver (e.g., an infrared receiver). Accordingly, a user of access device 120 can create content (e.g., by taking a picture or drafting a text message) and provide the content to content hub subsystem 110.

As instructed by processor 340, graphics engine 350 may generate graphics, which may include graphical user interfaces ("GUIs") and their contents, including, but not limited to, one or more interactive graphical objects including graphics representative of group content, as well as one or more tools for interacting with the interactive graphical objects and their content.

As instructed by processor 340, output driver 360 may provide output signals to display 370. The output signals may include data representative of graphics generated by graphics engine 350. From the output signals, display 370 may present the graphics for experiencing by a user.

Access device 120 may include one or more facilities configured to direct one or more components of access device 120 to perform any of the client-side processed described herein. In certain embodiments, the facilities may include one or more applications (e.g., software applications) residing within the access device 120 and that may be executed by the access device 120. The applications may reside in memory unit 330 or in any other area of the access device 120 and be executed by the processor 340.

As shown in FIG. 3, the access device 120 may include an interactive content facility 380, which may be implemented as software in certain exemplary embodiments. The interactive content facility 380 may be configured to direct the access device 120 to automatically upload content to content hub subsystem 110 in response to a predefined event. For instance, content may be automatically uploaded to content hub subsystem 110 upon receipt or input of the content, including in response to capture or creation of the content. Alternatively, content may be uploaded to content hub subsystem 110 as directed by a user (e.g., in response to a user directing that content be sent to an address associated with content hub subsystem 110).

The interactive content facility 380 may be further configured to direct the access device 120 to generate and provide graphical user interfaces, interactive graphical objects, and content interaction tools. In particular, the interactive content facility 380 may be configured to direct the access device 120 to generate interactive graphical objects for group content received from content hub subsystem 110. As described above, the interactive graphical objects may be generated to include graphics representative of group content. The interactive content facility 380 may be configured to generate graphical user interfaces and include the interactive graphical objects in the graphical user interfaces. In a graphical user interface, interactive graphical objects may be visually displayed as including graphics representative of group content instances and with which a user is able to interact. Through the graphical user interface, a user may be able to edit, update, delete, add to, organize, filter, sort, search, transmit, and otherwise interact with interactive graphical objects or the content corresponding with the interactive graphical objects. The interactive content facility 380 may be configured to provide tools enabling the user to interact with the interactive graphical objects and corresponding content.

The generated graphical user interfaces may be displayed by any of the access devices 120 mentioned herein. In certain embodiments, a graphical user interface may be provided as a persistent graphical user interface on a display screen of an access device 120. For example, a graphical user interface may be persistently displayed on an Active Desktop, wallpaper, or screensaver application, as a desktop widget, or as part of any other persistent display application running on an access device 120. With content hub subsystem 110 pushing group content in real time or near real time, a persistent graphical user interface may display up-to-date group content that is synchronized with group content that has been uploaded to content hub system 110.

To facilitate an understanding of the graphical user interfaces, interactive graphical objects, and content interaction tools that may be provided to a user, several exemplary graphical user interfaces and interactive graphical objects, which may be generated by access device 120, will now be described in reference to FIGS. 4A through 9C. In certain embodiments, a user may be granted access to the exemplary graphical user interfaces after he or she has been authenticated as having access privileges.

Figure 4A:
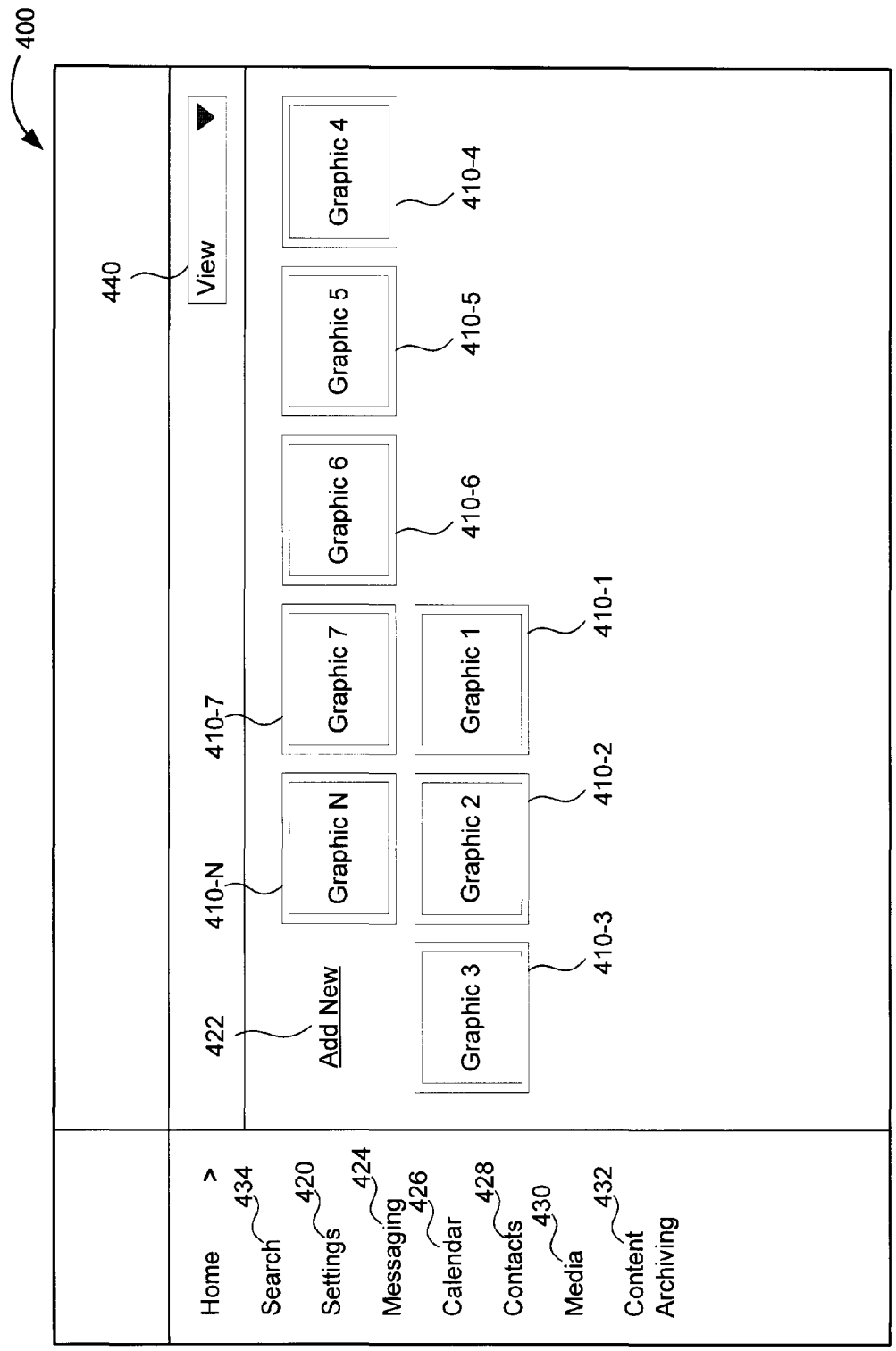
FIG. 4A illustrates an exemplary graphical user interface including interactive graphical objects that may be displayed by the access device of FIG. 3.

FIG. 4A illustrates an exemplary graphical user interface 400 ("GUI 400") that may be generated and displayed by an access device 120. As shown in FIG. 4A, GUI 400 may include interactive graphical objects 410-1 through 410-N (collectively "interactive graphical objects 410"). The interactive graphical objects 410 may be generated by the access device 120 and may include graphics representative of corresponding group content that has been provided by users in a group and distributed by content hub subsystem 110 to the users in the group, as described above. In FIG. 4A, the interactive graphical objects 410-1 through 410-N are shown to include Graphics 1 through N, respectively.

In certain embodiment, a graphic included in an interactive graphical object 410 is representative of a content instance associated with the interactive graphical object 410. The graphics may include any suitable representations of content and may be generated based on the content, content type, and/or other content attributes.

For textual content, for example, an interactive graphical object 410 may be generated to include an image representative of at least a portion of text data. For instance, access device 120 may receive a text message (e.g., an SMS message) from content hub subsystem 110 and may generate an image based on the text data (e.g., text data such as "Hi, Mom. I love you.") The interactive content facility 380 may be configured to direct the access device 120 to generate a graphical image based on and representative of the text data.

The graphical image may be made to look a preselected way. As an example, the access device 120 may be configured to use a handwritten font for a graphical representation of text data. As another example, a background may be included in the graphical image. One example of a background includes an image of notepad paper or lined paper, which may provide a virtual representation of a handwritten note.

In certain embodiments, a font, theme, or look of an image may be selected based on user profile data 224 for the user providing the content. The system 100 may allow the user to select in advance any particular settings, themes, looks, and fonts to be applied to his or her content. In this or similar manner, system 100 may enable each user in a group to personalize the presentation of content. Such tools may be accessible by way of a settings tool 420 in GUI 400.

For image content (e.g., photographs), an interactive graphical object 410 may be generated to include a graphic that is a copy of at least a portion of the image content. In certain embodiments, the access device 120 may be configured to scale or otherwise modify image content to generate a suitable graphic. For video content, a corresponding interactive graphical object 410 may be generated to include a poster image associated with the video content or a frame image from the video. For audio content, a corresponding interactive graphical object 410 may be generated to include a predefined image indicative of the associated content being in audio format. For example, the image may include an audio speaker graphic or audio equalizer bar graphic. For multimedia content, a corresponding interactive graphical object 410 may be generated to include any of the above graphics depending on the content and/or types of content included in the multimedia content.

Graphics in interactive graphical objects 410 may be configured to indicate other information associated with content, including, but not limited to, duration of audio or video content, timestamp information associated with the content (e.g., date and/or time posted), a particular addressee of content (e.g., "For Mom"), user-specified data, and content titles. Interactive graphical objects 410 may also include tags that have been associated with content as described above.

GUI 400 may include one or more tools enabling a user to create and send content to the content hub subsystem 110 for distribution to a group. For example, GUI 400 includes an "Add New" link 422, which when selected may launch a tool for creating and sending content to the content hub subsystem 110. The new content may be distributed by the content hub subsystem 110, as described above. Accordingly, a new interactive graphical object 410 may be generated and included in GUI 400.

GUI 400 may provide a user with access to other services. As shown in FIG. 4A, for example, links are provided to services such as messaging services 424, calendar services 426, contacts management services 428, and media management services 430. These services may be applications running on access device 120, content hub subsystem 110, or third-party devices. Such services may be useful for working with and sharing group content. For example, messaging services 424 may assist a user in creating and providing content to the content hub subsystem 110, and calendar services 426 may assist the user in creating and posting content that is related to calendaring (e.g. a note about an appointment). As another example, messaging services 424 may facilitate sending content to other access devices 120, including access devices that are not connected to content hub subsystem 110.

GUI 400 may also provide a user with access to content archiving services 432, including content creation applications such a scrapbooking and family album applications. Again, such services 432 may be applications running on access device 120, content hub subsystem 110, or third-party devices. A scrapbooking application may be configured to enable a user to access and use group content to create scrapbook pages or other digital memorabilia. In certain embodiments, a tool is provided enabling a user to select interactive graphical objects 410 to be included in a new content creation such as a slideshow of photographs, a blog or other webpage, or a planning calendar view, for example.

Tools enabling users to interact with the interactive graphical objects 410 may be provided. For example, interactive graphical objects 410 may be sorted, filtered, or searched based on any attributes associated with the interactive graphical objects, corresponding content (e.g., content tag information), or corresponding users. Accordingly, different views of interactive graphical objects 410 and subsets of interactive graphical objects 410 may be provided. FIG. 4A illustrates a link to a search tool 434 that may be used to search for interactive content instances 410, content, or information including in content tags.

By representing content with interactive graphical objects 410, interactive content facility 380 can support extensible views and interactions with group content. In FIG. 4A, GUI 400 illustrates a mosaic view of interactive graphical objects 410 arranged in the order in which the associated content instances were provided to the content hub subsystem 110. In the context of a group being a family, such a mosaic view of interactive graphical objects 410 may be referred to as a "virtual refrigerator door" having interactive graphical objects 410 attached thereto. As mentioned above, the interactive content facility 380 may be configured to provide effects indicative of a metaphor to a virtually refrigerator door, including, but not limited to, effects representative of magnetically attaching an object to a refrigerator door.

GUI 400 may provide one or more tools enabling a user to select or create other views of interactive graphical objects 410. For example, certain tools may enable a user to rearrange interactive graphical objects 410 within GUI 400 in a generally free-form manner. Accordingly, a user can use interactive graphical objects 410 to create a custom mosaic of group content. In certain embodiments, a plurality of predefined and selectable views may be supported. In FIG. 4A, GUI 400 includes a view selection tool 440 with which a user can select a view from a plurality of different view templates. Exemplary views may include, but are not limited to, views in which interactive graphical objects 410 are organized by user, content type, or timestamp information.

Figure 4B:
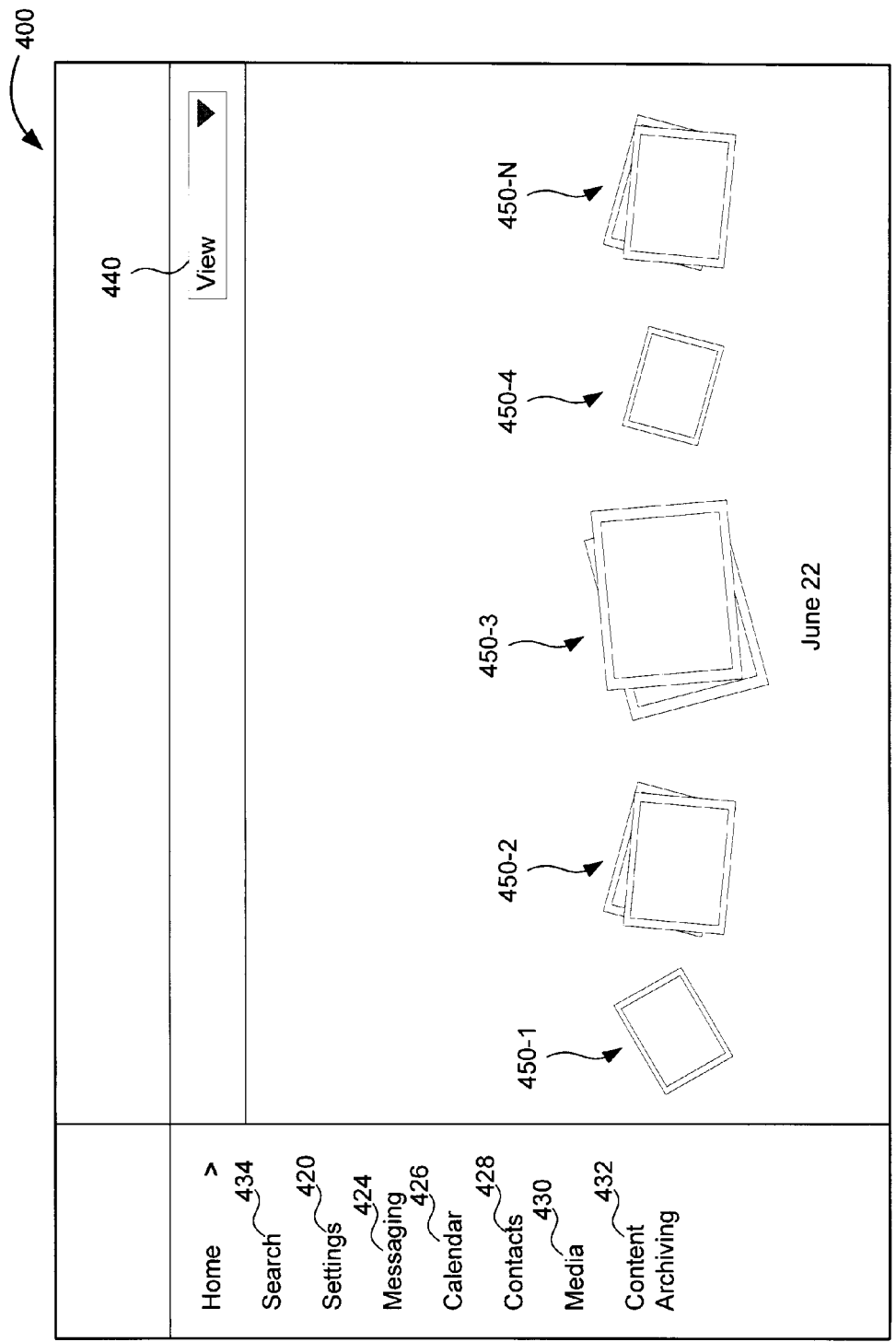
FIG. 4B illustrates another view of interactive graphical objects in the graphical user interface of FIG. 4A.

FIG. 4B illustrates a view of another arrangement of interactive graphical objects 410 that may be presented in GUI 400. In FIG. 4B, interactive graphical objects 410 are arranged in separate stacks 450-1 through 450-N (collectively "stacks 450"). The stacks 450 may be visually depicted as interactive graphical objects 410 stacked on top of one another. GUI 400 may provide tools enabling a user to scroll through a an arrangement (e.g., a row) of stacks 450, with a highlighted or selectable stack (e.g., stack 450-3) being positioned at a location that is approximately central within a window, and the user being able to move stacks 450 in and out of the central location as he or she scrolls through the stacks 450. The user may select a stack 450 to gain access to capabilities for scrolling through and selecting from interactive graphical objects 410 included in the stack 450.

In FIG. 4B, each stack 450 includes interactive graphical objects 410 corresponding with content posted on the same calendar day. That is, interactive graphical objects 410 have been organized into stacks based on the day their corresponding content instances were posted to content hub subsystem 110. Within a stack 450, the interactive graphical objects 410 may be arranged by content posting times. This arrangement is illustrative only and not limiting in any sense. Other ways of organizing interactive graphical objects 410 into stacks 450 (e.g., by user or content type) may be used in other examples.

While FIGS. 4A and 4B illustrate exemplary views of interactive graphical objects 410, other views can be supported by system 100. In certain embodiments, views specific to particular access devices 120 or types of access devices 120 may be provided. Such views may be modifications of other views. For example, a scaled down version of GUI 400 may be provided by an access device 120 having limited resources, as may be the case for certain mobile devices.

Interactive graphical objects 410 in GUI 400 may be selectable by a user. When an interactive graphical object 410 is selected by a user, the interactive content facility 380 may detect the selection and perform a pre-associated action. For example, the selected interactive graphical object 410 may be expanded and reveal an expanded view having one or more content interaction tools enabling further user interaction with the interactive graphical object 410 and corresponding content. Content interaction tools included in an expanded view may be specific to the particular interactive graphical object 410 or the type of content associated with the interactive graphical object 410. An expanded interactive graphical object 410 may include a graphic representative of the corresponding content.

Figure 5A:
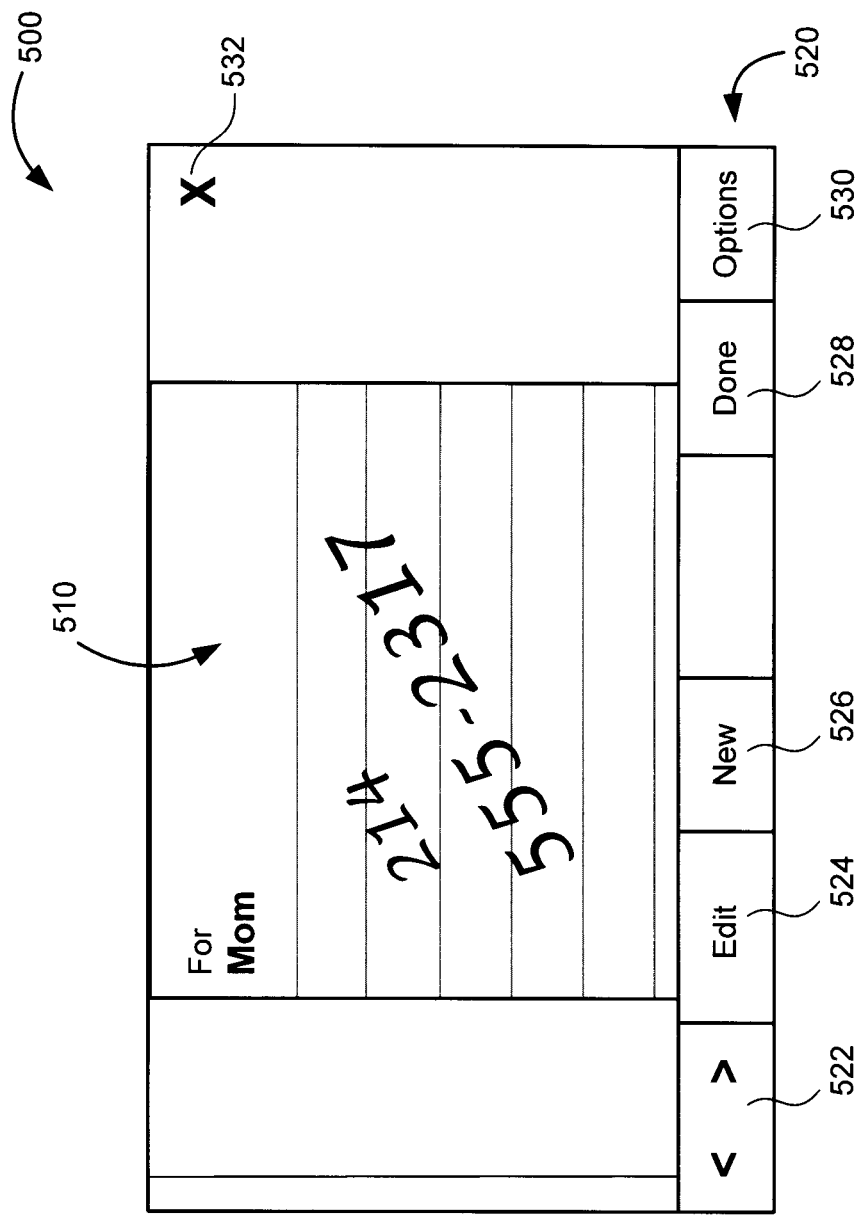
FIG. 5A illustrates an exemplary expanded view of an interactive graphical object.

FIG. 5A illustrates an exemplary expanded view 500 of an interactive graphical object 410. As shown, the expanded view 500 may include a graphic within a graphics area 510. The graphic is representative of a content instance associated with the interactive graphical object 410. In the example shown in FIG. 5A, the graphic includes an image representative of textual content (e.g., a note including digits of a telephone number). The textual content is represented in a handwritten font on a lined notepad background. In addition, the graphic includes a visual indication that the content is a note "For Mom."

As shown in FIG. 5A, the expanded view 500 may include a toolbar 520 of content interaction tools. The tools may include incremental arrows 522 enabling a user to scroll through expanded views 500 of interactive graphical objects 410 in a predetermined order (e.g., the order shown in FIG. 4A), an edit tool 524 enabling a user to modify the interactive graphical object 410, a tool 526 enabling the user to create a new interactive graphical object 410 associated with the interactive graphical object 410, a tool 528 for submitting updates to the interactive graphical object 410, an options tool 530 enabling the user to launch a menu of selectable options associated with the IG0 410, and a tool 532 for closing the expanded view 500.

Figure 5B:
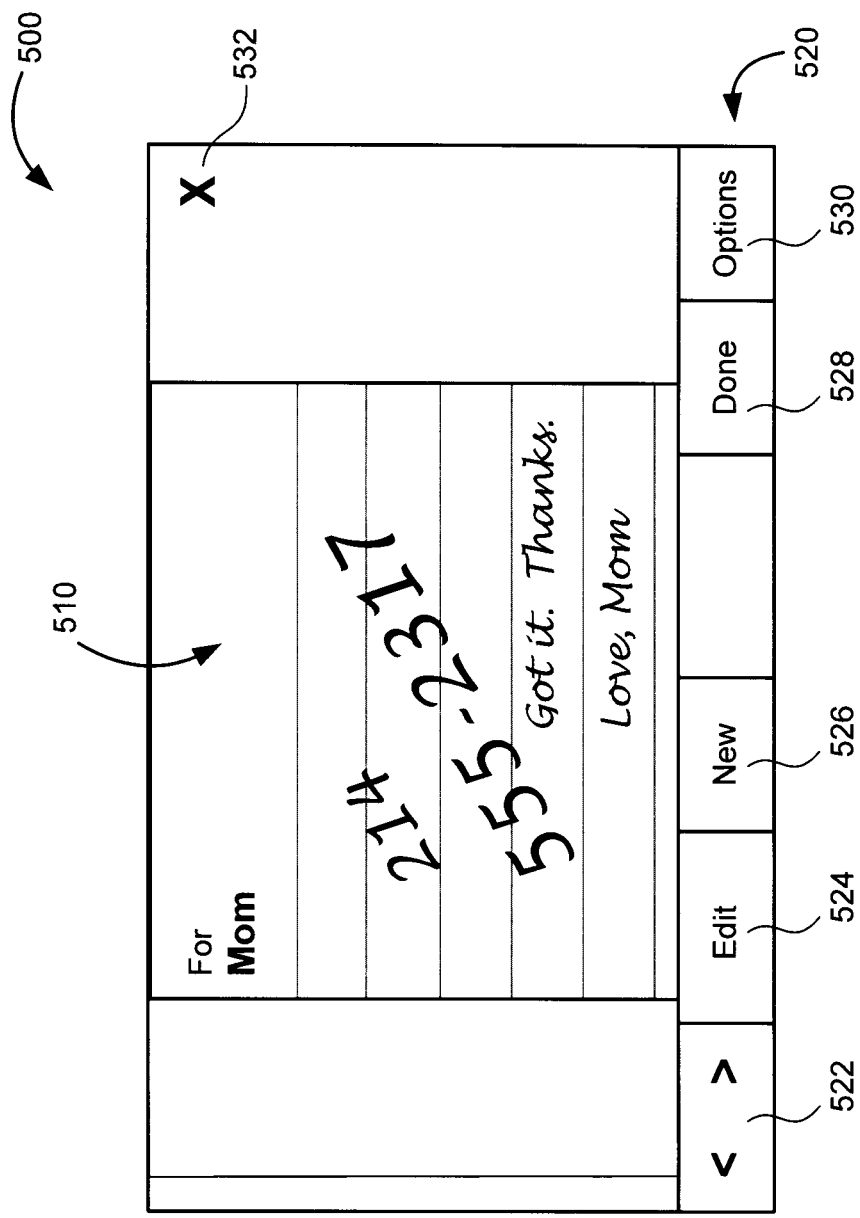
FIG. 5B illustrates an edited version of the exemplary interactive object of FIG. 5A.

When a user selects the edit tool 524, interactive content facility 380 may detect the selection and provide tools enabling the user to edit the content associated with interactive graphical object 410. For example, the user may annotate interactive graphical object 410 with additional content. FIG. 5B illustrates an expanded view 500 of an edited version of the interactive graphical object 410 shown in FIG. 5A. As shown in FIG. 5B, the original interactive graphical object 410 has been annotated with a response to the original note, the response stating, "Got it. Thanks. Love, Mom." In this or similar manner, a user is able to use group content to communicate, collaborate, and interact with other users in a group. Significantly, users may be allowed to edit (e.g., annotate) their own content as well as group content provided by other users. As another example, one member of a group may post a shopping list for the group, and other members of the group may utilize an interactive graphical object 40 to edit the list, including adding and removing list items, striking through at item, adding comments or symbols to items (e.g. a smiley face next to ice cream), etc.

Figure 6:
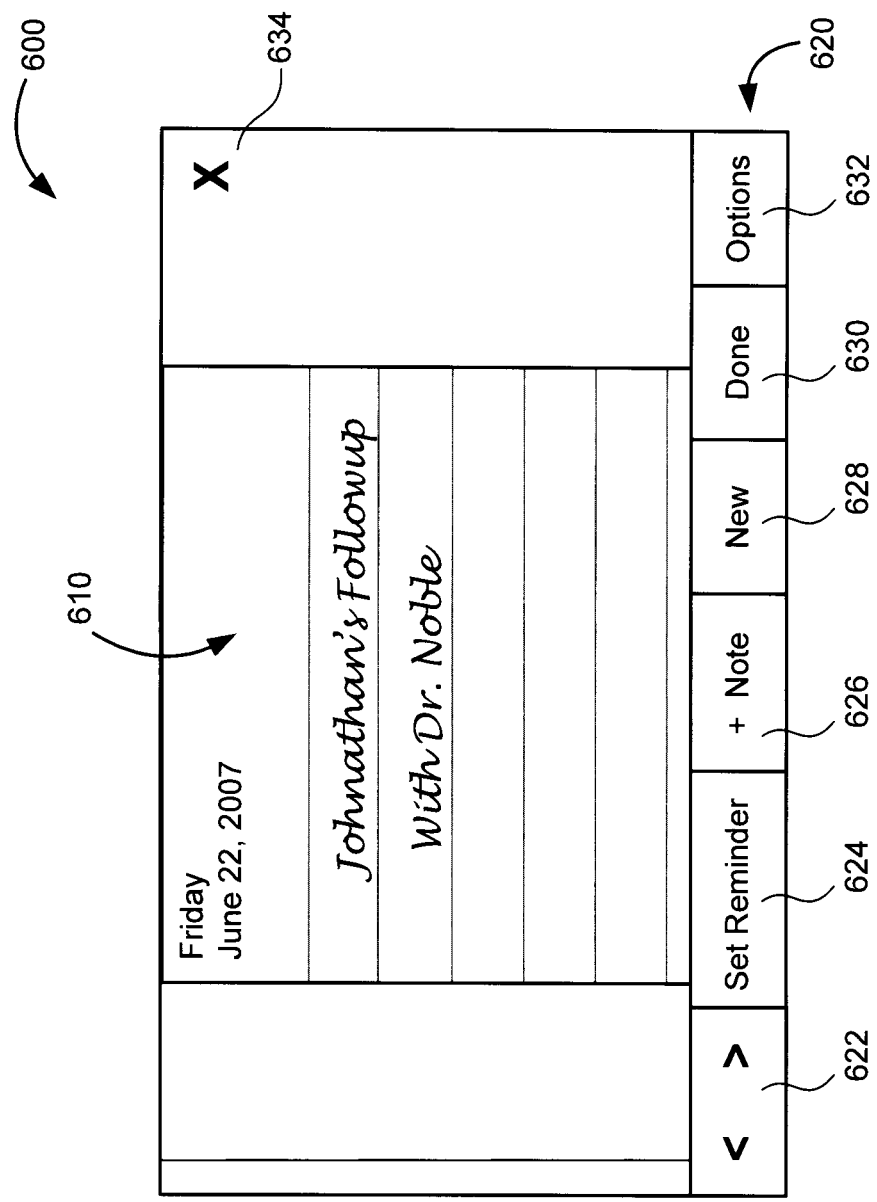
FIG. 6 illustrates another exemplary expanded view of another interactive graphical object.

FIG. 6 illustrates an expanded view 600 of another exemplary interactive graphical object 410. The expanded view 600 may include a graphics area 610 having a representation of content associated with the interactive graphical object 410 included therein. As shown in FIG. 6, the interactive graphical object 410 represented by expanded view 600 may be associated with calendar-type content, in this case a free-form calendar note reminding of a scheduled appointment. Note-based calendaring such as represented in FIG. 6 may provide users with a generally free-form way of providing and tracking user schedules as a group. This type of calendaring using interactive graphical objects 410 may be preferable to traditional calendaring applications that tend to be very structured.

Expanded view 600 may include a toolbar 620 having content interaction tools for scrolling 622 through expanded views of interactive graphical objects 410, setting a reminder 624, adding a note 626 to an interactive graphical object 410, creating 628 new content or a new interactive graphical object 410, submitting edits 630 to the interactive graphical object 410, launching a menu of selectable options 632 associated with the IG0 410, and closing 634 the expanded view 600.

As shown, the tools in toolbars 520 and 620 may be different and may be specific to the content and/or type of content with which an interactive graphical object 410 is associated. For example, the set reminder tool 624 may be provided in an expanded view 600 for an interactive graphical object 410 associated with calendar-type content.

Figure 7:
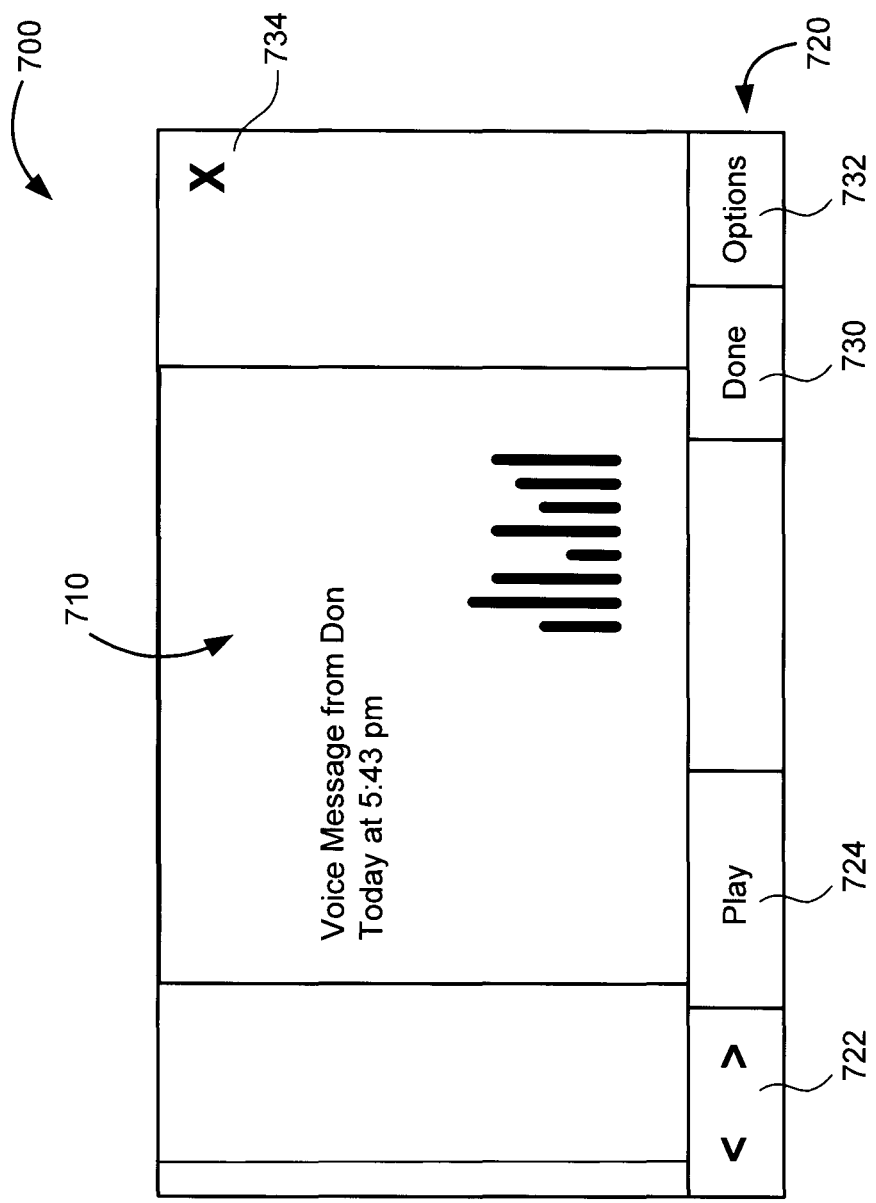
FIG. 7 illustrates yet another exemplary expanded view of another interactive graphical object.

FIG. 7 illustrates an expanded view 700 of another exemplary interactive graphical object 410. The expanded view 700 may include a graphics area 710 having a representation of content associated with the interactive graphical object 410. As shown in FIG. 7, the interactive graphical object 410 represented by expanded view 700 may be associated with audio content, in this case a voice message, and the graphic may be indicative of the audio content.

Expanded view 700 may include a toolbar 720 having content interaction tools for scrolling 722 through expanded views of interactive graphical objects 410, playing 724 the audio content associated with the interactive graphical object 410, submitting 730 edits to an interactive graphical object 410, launching 732 a menu of selectable options associated with the IG0 410, and closing 734 the expanded view 700.

Figure 8:
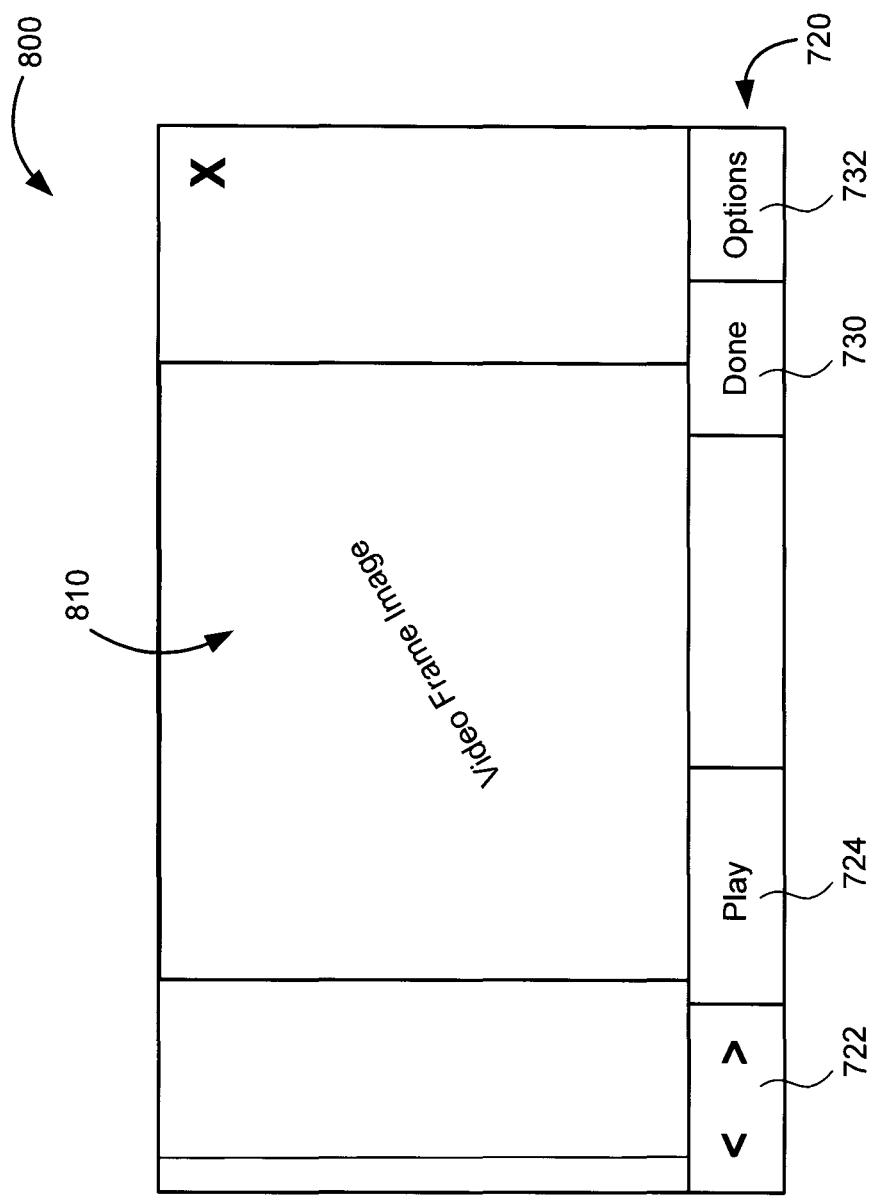
FIG. 8 illustrates yet another exemplary expanded view of another interactive graphical object.

FIG. 8 illustrates an expanded view 800 of another interactive graphical object 410. The expanded view 800 may include a graphics area 810 having a representation of content associated with the interactive graphical object 410. The interactive graphical object 410 associated with expanded view 800 may correspond with video content, and the graphic may be a frame image from the video content. Expanded view 800 may include a toolbar 720 having the content interaction tools shown in expanded view 700.

Figure 9A:
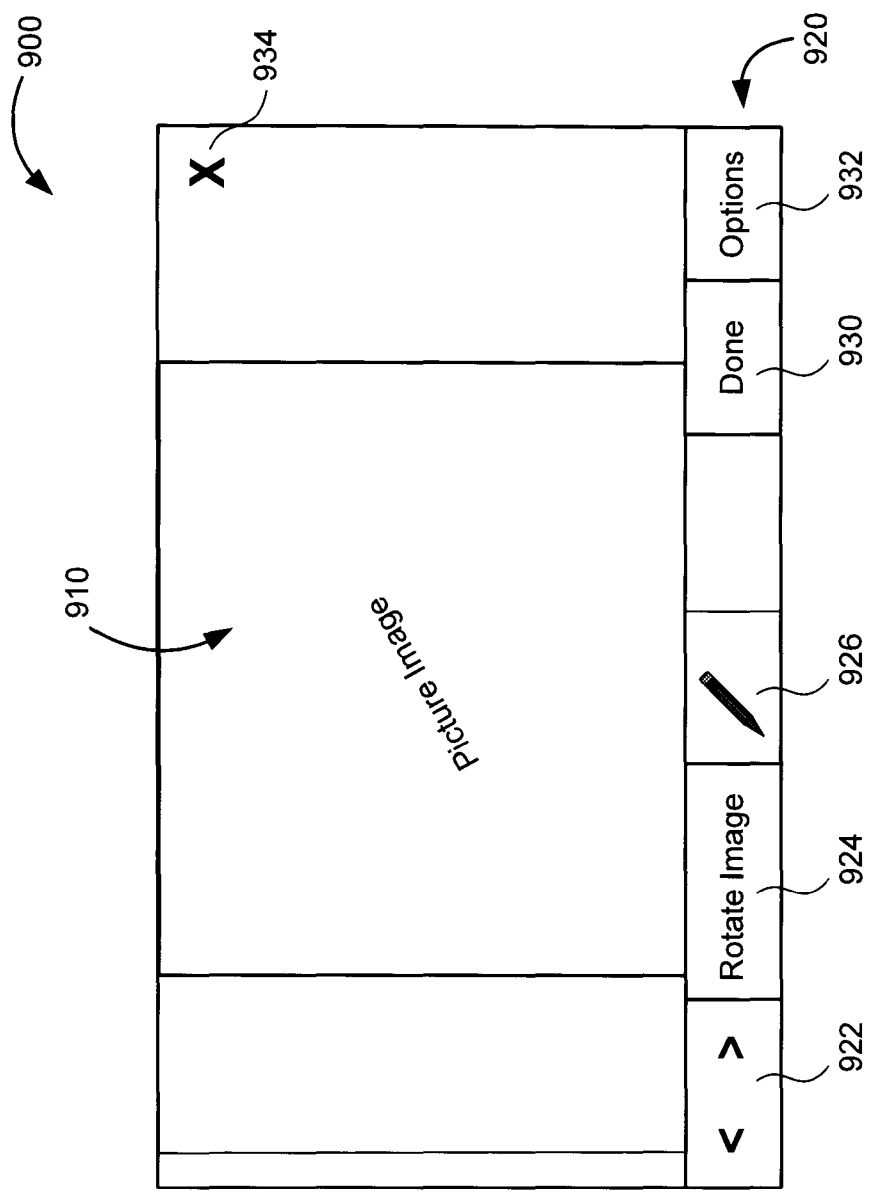
FIG. 9A illustrates yet another exemplary expanded view of another interactive graphical object.

FIG. 9A illustrates an expanded view 900 for another interactive graphical object 410. The expanded view 900 may include a graphics area 910 having a representation of content associated with the interactive graphical object 410. The interactive graphical object 410 represented by expanded view 900 may be associated with image content such as a photograph, and the graphic may be a copy of the photograph.

Expanded view 900 may include a toolbar 920 having content interaction tools for scrolling 922 through expanded views of interactive graphical objects 410, rotating 924 the picture image content associated with the interactive graphical object 410, adding an annotation 926 to the picture image, submitting 930 edits to an interactive graphical object 410, launching 932 a menu of selectable options associated with the IG0 410, and closing 934 the expanded view 900.

Figure 9B:
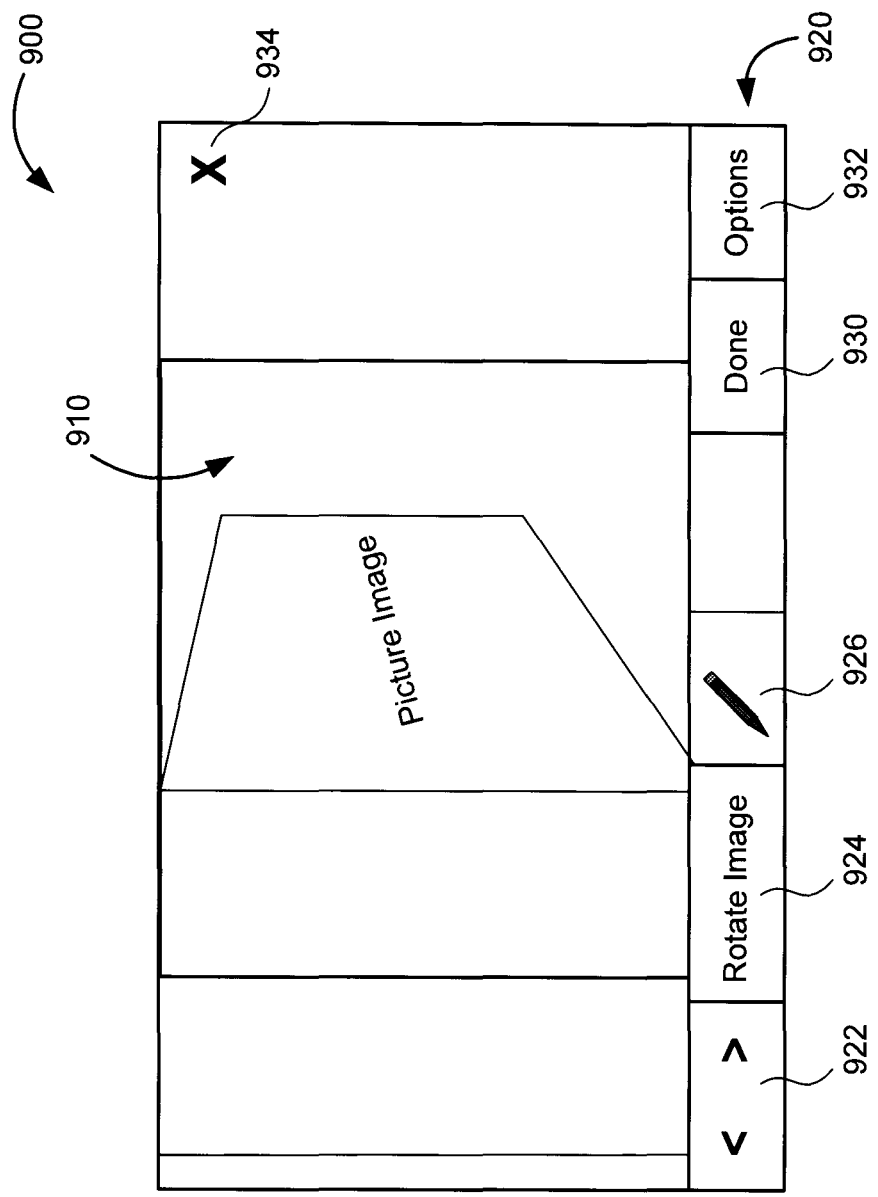
FIG. 9B illustrates another expanded view of the exemplary interactive graphical object of FIG. 9A.
Figure 9C:
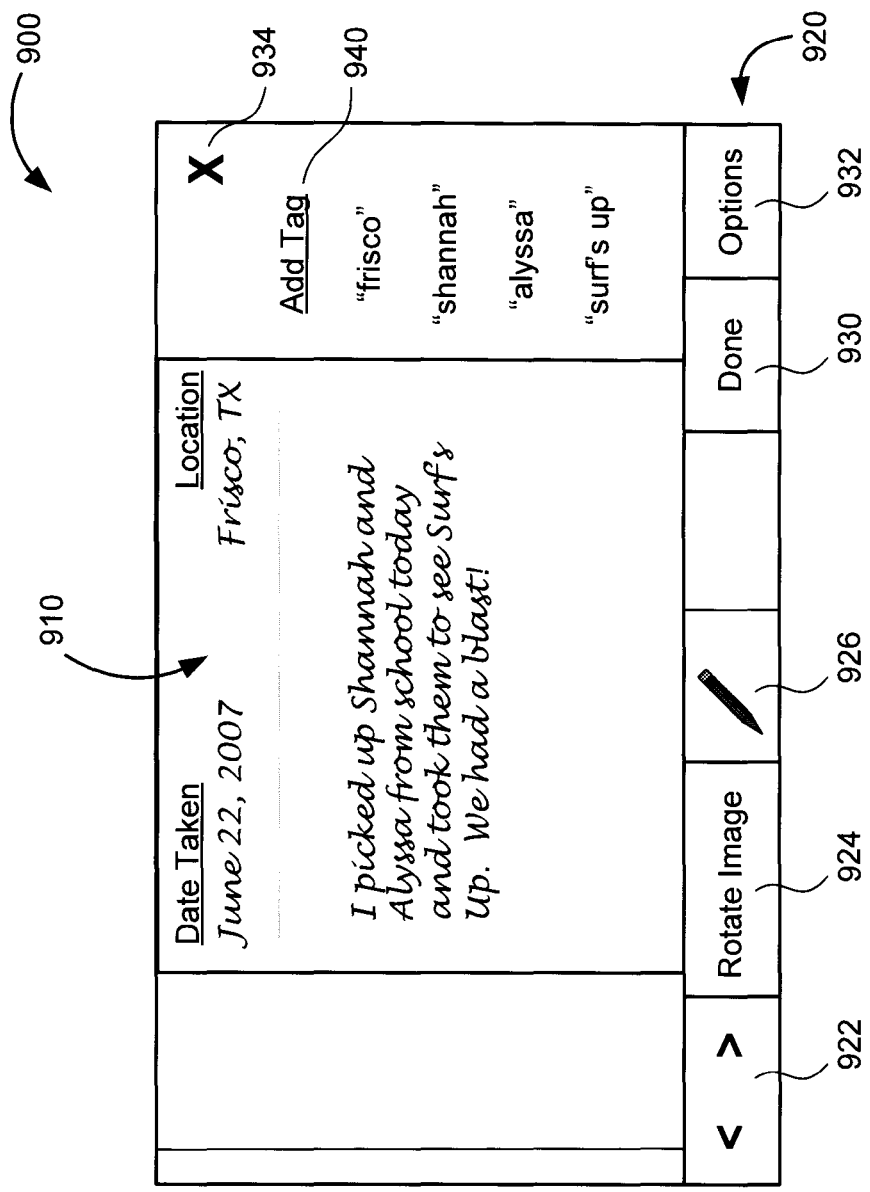
FIG. 9C illustrates another expanded view of the exemplary interactive graphical object of FIG. 9B.

When a user selects tool 926, interactive content facility 380 may be configured to provide at least one tool for editing the picture image content, detect an edit, and modify the contents of the interactive graphical object 410. The tools may include visual representation of an edit. For example, the picture image in graphics area 910 may be animated to flip over such that a note can be added to its backside. FIG. 9B illustrates the picture image at a particular point of being animatedly flipped in expanded view 900. FIG. 9C illustrates a virtual backside of the picture image in graphics area 910 after the image has been visually flipped in expanded view 900. As shown in FIG. 9C, the user is provided with tools for annotating the virtual backside of the picture image with a note and an indication of the date and location at which the picture was taken.

As shown in FIG. 9C, expanded view 900 may provide a tool 940 for adding one or more tags to the interactive graphical object 410. Tags may include any information descriptive of the content associated with the interactive graphical object 410, including keywords related to the content (e.g., keywords in a note associated with a picture), as described above.

The user may actuate tool 930 to submit the updates to the content associated with the interactive graphical object 410. The access device 120 may provide data representative of the updates to content hub subsystem 110, which may distribute data representative of the updates to the appropriate access devices 120 associated with users in the same group. Accordingly, users in the group may be provided access to picture image and the annotations added thereto.

Figure 10:
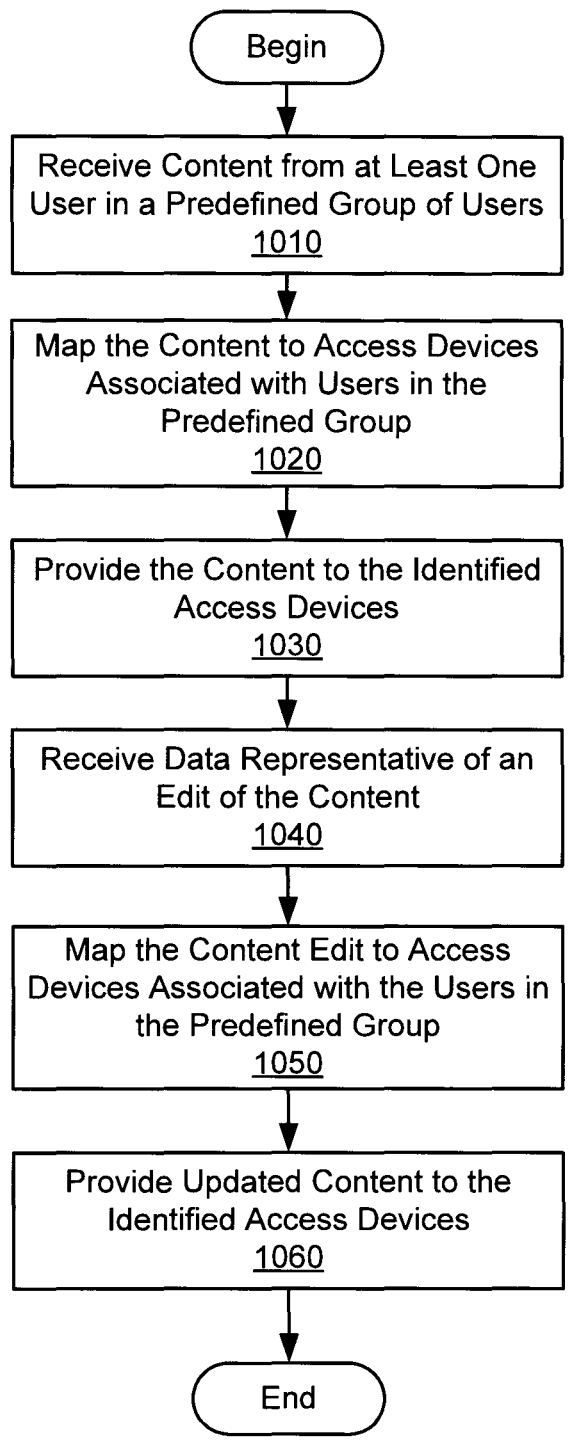
FIG. 10 is a flowchart illustrating an exemplary interactive content distribution method.

FIG. 10 illustrates an exemplary method of interactive group content distribution from a content hub subsystem perspective. While FIG. 10 illustrates exemplary steps according to one embodiment, other embodiments may omit, add to, reorder, and/or modify any of the steps shown in FIG. 10.

In step 1010, content is received from at least one user in a predefined group of users. Step 1010 may be performed in any of the ways described above, including content hub subsystem 110 receiving data representative of the content over network 125 from at least one access device 120 associated with at least one user in the predefined group.

In step 1020, the content is mapped to access devices 120 associated with users in the predefined group. Step 1020 may be performed in any of the ways described above, including using data maintained by content hub subsystem 110 to map content to a group, users in the group, and access devices associated with the users.

In step 1030, the content is provided to the access devices 120 identified in step 1020. Step 1030 may be performed in any of the ways described above, including content hub subsystem 110 distributing data representative of the content to the access devices 120 associated with users in the predefined group.

In step 1040, data representative of an edit of the content is received. Step 1040 may be performed in any of the ways described above, including content hub subsystem 110 receiving data representative of the content edit over network 125 from an access device 120.

In step 1050, the content edit is mapped to access devices 120 associated with users in the predefined group. Step 1050 may be performed similarly to step 1020.

In step 1060, the updated content is provided to the access devices 120 identified in step 1050. Step 1060 may be performed similarly to step 1030.

Figure 11:
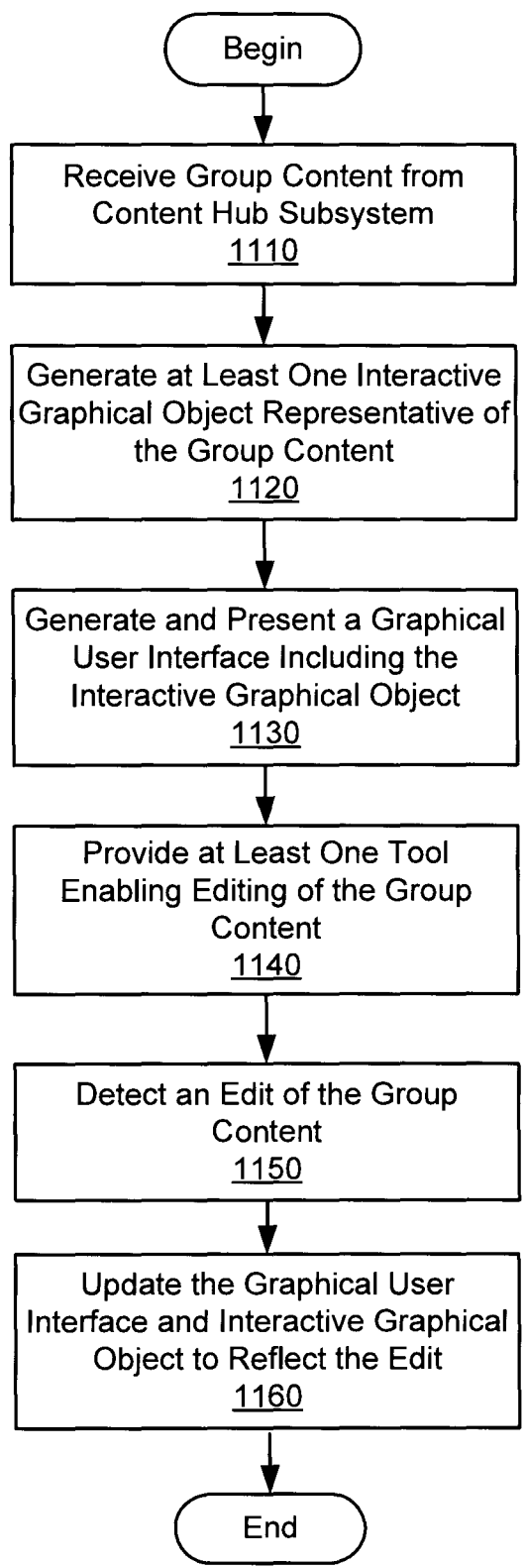
FIG. 11 is a flowchart illustrating an exemplary interactive content sharing method.

FIG. 11 illustrates an exemplary method of interactive group content sharing from an access device perspective. While FIG. 11 illustrates exemplary steps according to one embodiment, other embodiments may omit, add to, reorder, and/or modify any of the steps shown in FIG. 11.

In step 1110, group content is received from content hub subsystem 110. Step 1110 may be performed in any of the ways described above, including an access device 120 receiving data representative of the group content from content hub subsystem 110 over network 125. The group content may have been received and distributed to by content hub subsystem 110 to access devices 120 associated with users in a predefined group of users.

In step 1120, at least one interactive graphical object representative of the group content is generated. Step 1120 may be performed in any of the ways described above, including interactive content facility 380 of an access device 120 directing processor 340 to generate the interactive graphical object based on the group content and/or the group content type.

In step 1130, a graphical user interface including the interactive graphical object is generated and presented. Step 1130 may be performed in any of the ways described above.

In step 1140, at least one tool enabling editing of the group content is provided. Step 1140 may be performed in any of the ways described above, including providing the tool in the graphical user interface generated in step 1130. The tool may include one or more of the tools described above.

In step 1150, an edit of the group content is detected. The edit may include a user edit performed using a tool provided in step 1140. Interactive content facility 380 may be configured to detect the edit.

In step 1160, the graphical user interface and interactive graphical object is updated to reflect the edit. Step 1160 may be performed as described above, including access device 120 providing data representative of the edit to content hub subsystem 110, the content hub subsystem 110 distributing updated content reflecting the edit to access devices 120 associated with users in a group, and an access device 120 using the updated content to update the graphical user interface and interactive graphical object to reflect the edit.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A system comprising:
a plurality of interactive content facilities, each of said plurality of interactive content facilities within a respective one of a plurality of access devices; and
a content hub subsystem selectively and communicatively coupled to said plurality of access devices associated with a predefined group of users, said content hub subsystem being configured to
receive data representative of content from at least one of said access devices associated with said predefined group of users,
map said content to said access devices associated with said predefined group of users,
identify a computing platform of each of said plurality of access devices associated with said predefined group of users,
transcode data representative of said content into a data format selected for each of said plurality of access devices associated with said predefined group of users based on said identified computing platform, and
provide data representative of said content to each of said plurality of access devices associated with said predefined group of users in said data format;
wherein each of said access devices associated with said predefined group of users is configured to
generate at least one interactive graphical object representative of said content,
generate and present a graphical user interface including said at least one interactive graphical object; and
wherein said content hub subsystem is further configured to
receive data representative of an edit of said content from at least one of said access devices associated with said predefined group of users,
map said edit of said content to said access devices associated with said predefined group of users,
transcode data representative of said edit of said content into said data format for each of said plurality of access devices associated with said predefined group of users, and
push data representative of said edit to each of said access devices associated with said predefined group of users in said data format.

2. The system of claim 1, wherein said content includes a plurality of content instances provided by different ones of said users in said predefined group, said at least one interactive graphical object including a plurality of interactive graphical objects representative of said plurality of content instances, each of said access devices associated with said predefined group of users being configured to present a mosaic of said interactive graphical objects in said graphical user interface.

3. The system of claim 1, wherein said content hub subsystem is configured to use a plurality of diverse platforms to communicate with said plurality of access devices.

4. The system of claim 3, wherein said plurality of diverse platforms includes at least two of a voice communication platform, a subscriber television platform, and an Internet platform.

5. The system of claim 1, wherein said at least one interactive graphical object includes a graphic representative of said content, each of said access devices associated with said predefined group of users being configured to generate said graphic based on a type of said content.

6. The system of claim 5, wherein said type of content includes at least one of audio content, video content, image content, textual content, and multimedia content.

7. The system of claim 1, wherein said content hub subsystem is configured to archive said content, said archived content being organized by said predefined group.

8. The system of claim 1, wherein said at least one interactive graphical object includes a geo-tag indicative of a geographic location associated with said content.

9. The system of claim 1, wherein each of said access devices associated with said predefined group of users is configured to provide at least one tool in said graphical user interface, said at least one tool being configured to enable a user in said predefined group to interact with said at least one interactive graphical object.

10. The system of claim 9, wherein said at least one tool is configured to enable the user in said predefined group to edit said content corresponding with said at least one interactive graphical object.

11. The system of claim 10, wherein each of said access devices associated with said predefined group of users is configured to update said graphical user interface and said interactive graphical object to reflect said edit.

12. The system of claim 1, wherein each of said plurality of interactive content facilities within a respective one of said plurality of access devices is configured to provide effects indicative of a virtual refrigerator door and magnetically attaching said at least one interactive graphical object to said virtual refrigerator door in said graphical user interface.

13. The system of claim 1, wherein the predefined group of users consists of users associated with a wireless telephone subscription account.

14. The system of claim 1, wherein said identifying of said computing platform for each of said plurality of access devices includes identifying a computing platform of at least one of a wireless telephone, a computer, a gaming device, and a set-top box associated with said predefined group of users.

15. A method comprising:
providing a content hub subsystem;
receiving with said content hub subsystem data representative of group content from at least one user in a predefined group of users;
identifying a computing platform of each of a plurality of access devices associated with said predefined group of users;
transcoding said data representative of said group content into a data format selected for each of said plurality of access devices associated with said predefined group of users based on said identified computing platform;
distributing data representative of said group content with said content hub subsystem to at least one access device among the plurality of access devices associated with at least one user in said predefined group of users in said data format;
generating at least one interactive graphical object representative of said group content;
presenting a graphical user interface including said at least one interactive graphical object;
providing data representative of an edit of said group content to said content hub subsystem;
mapping with said content hub subsystem said edit of said group content to said plurality of access devices associated with said predefined group of users;
transcoding said data representative of said edit of said group content into said data format for each of said plurality of access devices associated with said predefined group of users; and
pushing with said content hub subsystem said data representative of said edit to each of said plurality of access devices associated with said predefined group of users in said data format.

16. The method of claim 15, said generating said interactive graphical object including:
generating or selecting a graphic based on at least one of said group content and a type of said group content; and
displaying said graphic in said interactive graphical object in said graphical user interface.

17. The method of claim 15, further comprising:
detecting a user selection of said interactive graphical object in said graphical user interface; and
presenting an expanded view of said interactive graphical object in said graphical user interface, said expanded view including at least one tool enabling a user to interact with said group content corresponding with said interactive graphical object.

18. The method of claim 17, further comprising selecting said at least one tool for inclusion in said expanded view based on a type of said group content.

19. The method of claim 15, further comprising providing at least one tool in said graphical user interface, said at least one tool being configured to enable editing of said group content corresponding with said interactive graphical object.

20. The method of claim 15, embodied as computer-executable instructions on a non-transitory computer-readable medium.

21. An apparatus, comprising:
a communication interface configured to communicate with a content hub subsystem over a network, including receiving group content from a plurality of access devices associated with a predefined group of users via said content hub subsystem;
a processor communicatively connected to said communication interface;
a memory unit communicatively connected to said communication interface and said processor; and
an interactive content facility tangibly embodied in said memory unit, said interactive content facility configured to direct said processor to
transmit, via said communications interface, data representative of a computing platform of said apparatus to said content hub subsystem,
receive, in response to transmitting said data representative of said computing platform via said communications interface, at least one interactive graphical object in a data format selected for said apparatus based on said data representative of said computing platform,
generate and provide a graphical user interface including said at least one interactive graphical object in response to receiving said at least one graphical object in said data format, and
provide effects indicative of a virtual refrigerator door and magnetically attaching said at least one graphical object to said virtual refrigerator door in said graphical user interface.

22. The apparatus of claim 21, wherein said group content includes a plurality of content instances, said at least one interactive graphical object includes a plurality of interactive graphical objects representative of said plurality of content instances, and wherein said interactive content facility is configured to direct said processor to direct the apparatus to display a mosaic of said interactive graphical objects on said virtual refrigerator door in said graphical user interface.

23. The apparatus of claim 21, wherein said interactive content facility is configured to direct said processor to
detect a user selection of said interactive graphical object in said graphical user interface, and
present an expanded view of said interactive graphical object in said graphical user interface, said expanded view including at least one tool enabling a user to interact with said group content corresponding with said interactive graphical object.

24. The apparatus of claim 23, wherein said at least one tool is configured to enable a user of the apparatus to edit said group content corresponding with said interactive graphical object.

25. The apparatus of claim 24, wherein said interactive content facility is configured to direct said processor to:
- detect a user edit of said group content;
- provide data representative of said user edit to said content hub subsystem;
- receive data representative of updated group content from said content hub subsystem in said selected data format, said updated group content including said user edit; and
- update said interactive graphical object and said graphical user interface to reflect said user edit.

* * * * *